(12) United States Patent
Kawasaki et al.

(10) Patent No.: US 6,788,191 B2
(45) Date of Patent: Sep. 7, 2004

(54) METHOD AND APPARATUS FOR ALARMING DECREASE IN TIRE AIR-PRESSURE, AND PROGRAM FOR JUDGING DECOMPRESSION OF TIRE

(75) Inventors: Hiroaki Kawasaki, Kobe (JP); Yukio Nakao, Kobe (JP)

(73) Assignee: Sumitomo Rubber Industries, Ltd., Hyogo-Ken (JP)

(*) Notice: Subject to any disclaimer, the term of this patent is extended or adjusted under 35 U.S.C. 154(b) by 0 days.

(21) Appl. No.: 10/348,958

(22) Filed: Jan. 23, 2003

(65) Prior Publication Data

US 2003/0156023 A1 Aug. 21, 2003

(30) Foreign Application Priority Data

Jan. 23, 2002 (JP) .......................................... 2002-014435

(51) Int. Cl.⁷ .......................... B60C 23/00; B60C 23/02
(52) U.S. Cl. ...................... 340/443; 340/442; 340/444; 340/445; 340/446; 340/447; 73/146.2; 73/146.3; 73/146.4; 73/146.5
(58) Field of Search ................................ 340/442, 443, 340/445, 446, 447, 444; 73/146.5, 146.4, 146.3, 146.2

(56) References Cited

U.S. PATENT DOCUMENTS 5,498,072 A * 3/1996 Shimizu ...................... 303/191
6,076,035 A * 6/2000 Yanase ......................... 701/80
6,285,280 B1   9/2001 Wang .......................... 340/444
6,420,966 B2 * 7/2002 Sugisawa ..................... 340/442

FOREIGN PATENT DOCUMENTS

| JP | 7-47820 A | 2/1995 |
| JP | 2001-253334 A | 9/2001 |

* cited by examiner

*Primary Examiner*—Jeffery Hofsass
*Assistant Examiner*—Lam Pham
(74) *Attorney, Agent, or Firm*—Birch, Stewart, Kolasch & Birch, LLP

(57) ABSTRACT

A method for alarming decrease in tire air-pressure. The method includes the steps of: detecting rotational information of respective tires; respectively calculating and storing a wheel speed, a vehicle acceleration, a slip ratio between front and rear wheels, a running distance and a turning radius; accumulating the running distance, the moving-averaged vehicle acceleration and the slip ratio between front and rear wheels; obtaining a linear regression coefficient and a correlation coefficient of the vehicle acceleration and the slip ratio; judging whether at least a driving wheel tire has decompressed upon comparing a judged value of the linear regression coefficient and a reference value for internal pressure of the linear regression coefficient; and issuing an alarm of decrease in tire air-pressure. It is possible to improve performance and safety of the vehicle since it is possible to detect decompression of tires including at least one driving wheel tire, for instance, of not less than two wheel tires including the right and left driving wheels.

8 Claims, 7 Drawing Sheets

METHOD AND APPARATUS FOR ALARMING DECREASE IN TIRE AIR-PRESSURE, AND PROGRAM FOR JUDGING DECOMPRESSION OF TIRE

BACKGROUND OF THE INVENTION

The present invention relates to a method and an apparatus for alarming decrease in tire air-pressure and a program for judging decompression of a tire. More particularly, it relates to a method and an apparatus for alarming decrease in tire air-pressure and a program for judging decompression of a tire with which it is possible to improve performance and safety of a vehicle upon detecting decrease in tire air-pressure on the basis of rotational information of the tires.

Conventionally, apparatuses for issuing an alarm upon detecting decrease in air-pressure of tires of a four-wheeled vehicle might be roughly divided into two methods, namely a direct detection method and an indirect method. The direct detection method is a method of directly measuring an internal pressure of tires upon incorporating air-pressure sensors in, for instance, tire valves (reference should be made to, for instance, Japanese Unexamined Patent Publication No. 139117/1999) while the indirect method is a method in which decrease in internal pressure is detected on the basis of relative differences between wheel speeds or rotational angular velocities which can be obtained from rotational information of tires (reference should be made to, for instance, Japanese Unexamined Patent Publication No. 305011/1988).

While the direct detection method is advantaged in that the absolute internal pressure of each of the four wheels can be detected, it is disadvantaged in that costs involved are extremely high since it is necessary to provide pressure sensors, transmitters and receivers. In contrast thereto, the indirect method is advantaged in that costs are low.

However, since decrease in internal pressure is detected in the indirect method upon relative comparison of wheel speeds of tires or similar, it is impossible to detect decrease in internal pressure when all four wheel tires have simultaneously decompressed in a natural manner. It is also impossible to detect simultaneous decompression of both wheel tires of driving wheels.

SUMMARY OF THE INVENTION

It is an object of the present invention to provide a method and an apparatus for alarming decrease in tire air-pressure and a program for judging decompression of a tire with which it is possible to detect decrease in tire air-pressure of at least the driving wheel tires by using an indirect method employing rotational information of the tires.

In accordance with a first aspect of the present invention, there is provided a method for alarming decrease in tire air-pressure, which alarms decrease in internal pressure of a tire on the basis of rotational information obtained from tires attached to a vehicle, the method including the steps of: detecting rotational information of respective tires; respectively calculating and storing a wheel speed, a vehicle acceleration, a slip ratio between front and rear wheels, a running distance and a turning radius on the basis of the rotational information of the respective tires; performing moving-averaging of the vehicle acceleration and the slip ratio between front and rear wheels; accumulating the running distance, the moving-averaged vehicle acceleration and the slip ratio between front and rear wheels when the turning radius is not less than a specified value; obtaining a linear regression coefficient and a correlation coefficient of the vehicle acceleration and the slip ratio between front and rear wheels when the accumulated running distance has reached a specified distance; judging whether at least a driving wheel tire has decompressed upon comparing a judged value of the linear regression coefficient and a reference value for internal pressure of the linear regression coefficient which has been preliminarily calculated in the above step when the tires are reference internal pressure, the linear regression coefficient when the correlation coefficient is not less than a specified value being set as the judged value; and issuing an alarm of decrease in tire air-pressure on the basis of the result of judgment of decompression.

In accordance with a second aspect of the present invention, there is further provided an apparatus for alarming decrease in tire air-pressure, including: rotational information detecting means which detects rotational information of respective tires; a first calculating means which respectively calculates and stores a wheel speed, a vehicle acceleration, a slip ratio between front and rear wheels, a running distance and a turning radius on the basis of the rotational information of the respective tires; a second calculating means which performs moving-averaging of the vehicle acceleration and the slip ratio between front and rear wheels; an accumulating means which accumulates the running distance, the moving-averaged vehicle acceleration and the slip ratio between front and rear wheels when the turning radius is not less than a specified value; a third calculating means which obtains a linear regression coefficient and a correlation coefficient of the vehicle acceleration and the slip ratio between front and rear wheels when the accumulated running distance has reached a specified distance; a decompression judging means which judges whether at least a driving wheel tire has decompressed upon comparing a judged value of the linear regression coefficient and a reference value for internal pressure of the linear regression coefficient which has been preliminarily calculated when the tires are reference internal pressure, the linear regression coefficient when the correlation coefficient is not less than a specified value being set as the judged value; and an alarming means which issues an alarm of decrease in tire air-pressure on the basis of the result of judgment of decompression.

In accordance with a third aspect of the present invention, there is still provided a program for judging decompression of a tire, wherein a computer is made to function, for judging decrease in tire air-pressure, as a first calculating means which respectively calculates and stores a wheel speed, a vehicle acceleration, a slip ratio between front and rear wheels, a running distance and a turning radius on the basis of the rotational information of the respective tires; a second calculating means which performs moving-averaging of the vehicle acceleration and the slip ratio between front and rear wheels; an accumulating means which accumulates the running distance, the moving-averaged vehicle acceleration and the slip ratio between front and rear wheels when the turning radius is not less than a specified value; a third calculating means which obtains a linear regression coefficient and a correlation coefficient of the vehicle acceleration and the slip ratio between front and rear wheels when the accumulated running distance has reached a specified distance; and a decompression judging means which judges whether at least a driving wheel tire has decompressed upon comparing a judged value of the linear regression coefficient and a reference value for internal pressure of the linear regression coefficient which has been preliminarily calculated when the tires are of reference internal pressure, the linear regression coefficient when the correlation coefficient is not less than a specified value being set as the judged value.

DETAILED DESCRIPTION

The method and apparatus for alarming decrease in tire air-pressure and the program for judging decompression of a tire according to the present invention will now be explained with reference to the accompanying drawings.

Figure 1:
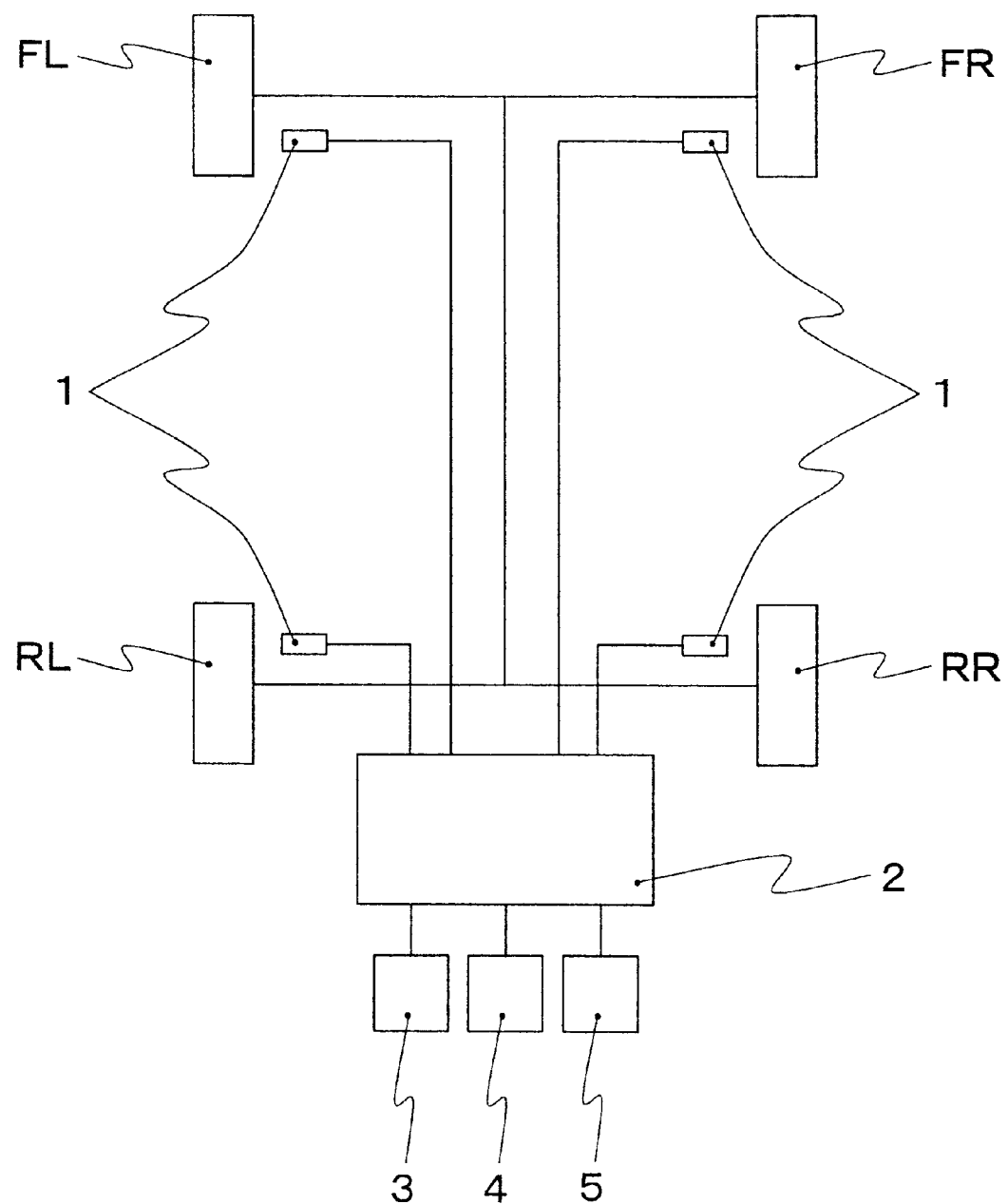
FIG. 1 is a block diagram illustrating one embodiment of the apparatus for alarming decrease in tire air-pressure according to the present invention.

As illustrated in FIG. 1, the apparatus for alarming decrease in tire air-pressure according to one embodiment of the present invention is for detecting whether any of air-pressures of four tires FL, FR, RL and RR (hereinafter generally referred to as Wi wherein i=1 to 4, 1: front left tire, 2: front right tire, 3: rear left tire, 4: rear right tire) attached to a four-wheeled vehicle is decreased or not, and includes ordinary rotational information detecting means 1 provided in relation to the respective tires Wi.

As the rotational information detecting means 1, wheel speed sensors for measuring wheel speed (rotational velocities) among rotational velocity information on the basis of the number of pulses by generating rotational pulses through an electromagnetic pickup or similar. Outputs of the rotational information detecting means 1 are supplied to a control unit 2, which is a computer such as an ABS. An alarm for decrease in internal pressure 3 comprising liquid crystal display elements, plasma display elements or CRT, an initialization switch 4 which might be operated by a driver when a tire has been exchanged or when adjustments are performed to set the internal pressure to a reference internal pressure for the tire (normal air-pressure), and an internal pressure check alarm 5, which is an alarming means for alarming a driver to inspect the tire air-pressure when no initialization operations are performed also upon running for a specified period of time or over a specified distance, are connected to the control unit 2. The initialization switch 4 resets a reference value which had been maintained until then and sets a new reference value upon being operated when a tire has been exchanged or adjusted to normal internal pressure.

Figure 2:
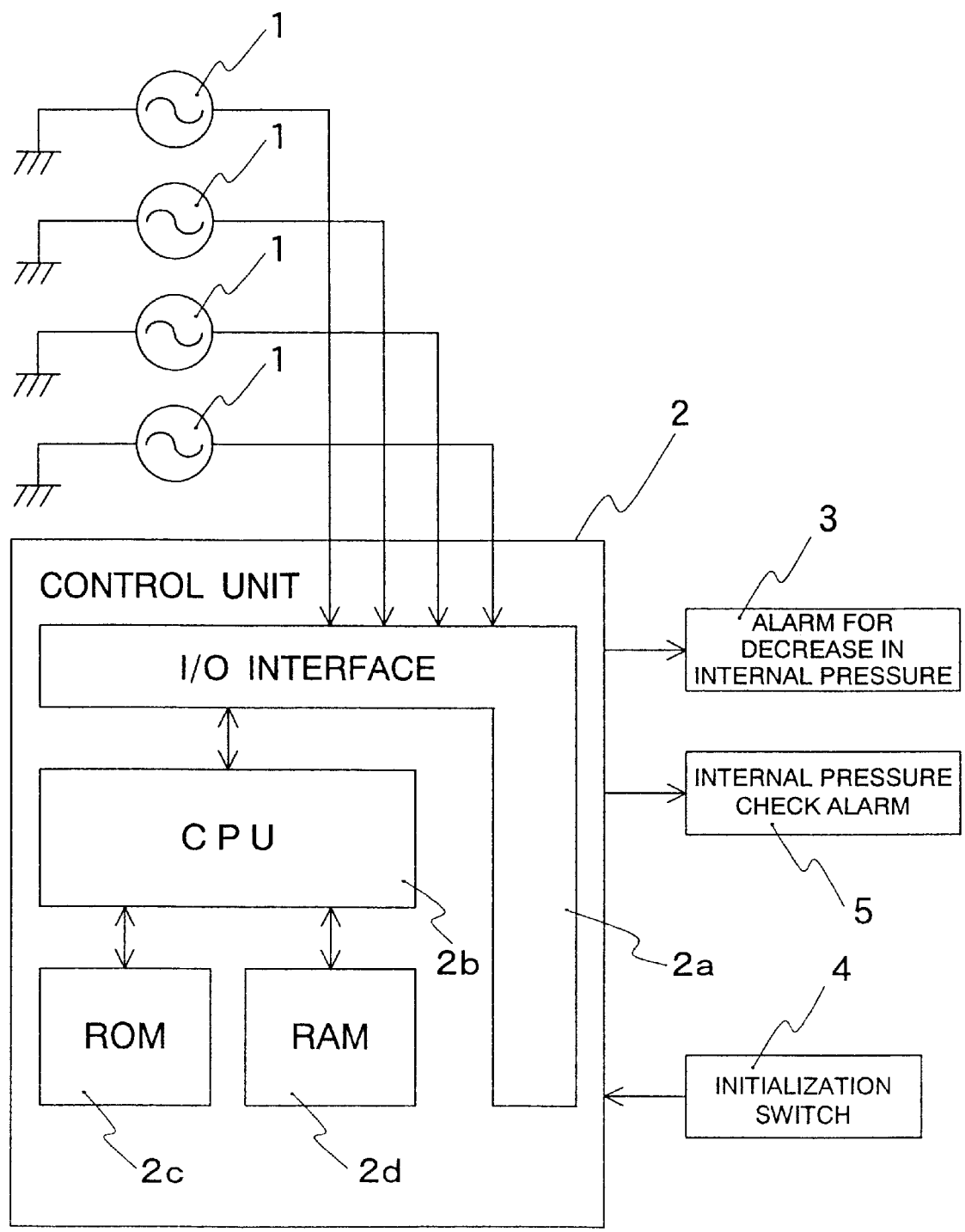
FIG. 2 is a block diagram illustrating electric arrangements of the apparatus for alarming decrease in tire air-pressure of FIG. 1.

As illustrated in FIG. 2, the control unit 2 comprises an I/O interface $2a$ required for sending/receiving signals to/from an external device, a CPU $2b$ which functions as a center of calculation, a ROM $2c$ which stores a control operation program for the CPU $2b$, and a RAM $2d$ into which data are temporally written and are read out therefrom when the CPU $2b$ performs control operations.

According to the present embodiment, due to the fact that the relationship between the vehicle acceleration and the slip ratio changes accompanying a decrease in internal pressure of a tire of the driving wheels, decompression of a single driving wheel tire or simultaneous decompression of both right and left driving wheel tires can be judged on the basis of time-varying changes in respective linear regression coefficients upon obtaining the vehicle acceleration and the slip ratio from the wheel speeds of the tires of the four wheels. Since no changes in the linear regression coefficients are found when a following wheel is decompressed, no decompression is judged accordingly. More particularly, no decompression of a tire is detected unless a driving wheel tire has decompressed. It is thus possible to judge whether at least one driving wheel tire has decompressed or not. More particularly, it is possible to judge decompression of a single driving wheel tire, simultaneous decompression of right and left driving wheel tires, decompression of a single driving wheel and a following wheel, decompression of right and left following wheels and a driving wheel, decompression of a following wheel and decompression of right and left driving wheel tires, as well as simultaneous decompression of all four wheel tires. However, since detection and judgment is performed upon averaging the wheel speeds of the right and left driving wheels, accuracy of detecting decompression of only one driving wheel or of a group of tires including one driving wheel will be inferior. It is accordingly desirable to judge whether simultaneous decompression of not less than two wheel tires including the right and left driving wheel tires has occurred or not. With this arrangement, the accuracy of judging decompression can be improved by using the apparatus for alarming decrease in tire air-pressure according to the present embodiment together with a conventional apparatus for detecting decrease in internal pressure upon relatively comparing rotational information of tires.

Accordingly, the present embodiment comprises: rotational information detecting means 1 which detect rotational information of respective tires Wi; a first calculating means which respectively calculates and stores a wheel speed, a vehicle acceleration, a slip ratio between front and rear wheels, a running distance and a turning radius on the basis of the rotational information of the respective tires Wi; a second calculating means which performs moving-averaging of the vehicle acceleration and the slip ratio between front and rear wheels; an accumulating means which accumulates the running distance, the moving-averaged vehicle acceleration and slip ratio between front and rear wheels when the turning radius is not less than a specified value; a third calculating means which obtains a linear regression coefficient and a correlation coefficient of the vehicle acceleration and the slip ratio between front and rear wheels when the accumulated running distance has reached a specified distance; a decompression judging means which judges whether at least a driving wheel tire has decompressed upon comparing a judged value of the linear regression coefficient and a reference value for internal pressure of the linear regression coefficient which has been preliminarily calculated when the tires are of reference internal pressure, the linear regression coefficient when the correlation coefficient is not less than a specified value being set as the judged value; and an alarm for decrease in internal pressure 3 which issues alarm of decrease in tire air-pressure on the basis of the result of judgment of decompression.

It further comprises a fourth calculating means which calculates an amount of fluctuation in a difference between respective slip ratio of the front and rear wheels on the left-hand side and that of the front and rear wheels on the right-hand side, and a regression coefficient correction means which corrects the linear regression coefficient in accordance with an average fluctuation amount of the amount of fluctuation per each specified distance of the running distance. It still further comprises an internal pressure check alarm 5, which is a second alarming means which issues an alarm to inspect an air-pressure of a tire when the initialization switch has not been operated or when a total running distance until the initialization switch is repeatedly operated after the initialization switch has been operated once.

In the program for judging decrease of a tire according to the present embodiment, the control unit 2 is made to function as the first calculating means which respectively calculates and stores a wheel speed, a vehicle acceleration, a slip ratio between front and rear wheels, a running distance and a turning radius on the basis of the rotational information of the respective tires; the second calculating means which performs moving-averaging of the vehicle acceleration and the slip ratio between front and rear wheels; the accumulating means which accumulates the running distance, the moving-averaged vehicle acceleration and slip ratio between front and rear wheels when the turning radius is not less than a specified value; the third calculating means which obtains a linear regression coefficient and a correlation coefficient of the vehicle acceleration and the slip ratio between front and rear wheels when the accumulated running distance has reached a specified distance; and the decompression judging means which judges whether at least a driving wheel tire has decompressed upon comparing a judged value of the linear regression coefficient and a reference value for internal pressure of the linear regression coefficient which has been preliminarily calculated when the tires are of reference internal pressure, the linear regression coefficient when the correlation coefficient is not less than a specified value being set as the judged value.

It is further made to function as the fourth calculating means which calculates an amount of fluctuation in a difference between respective slip ratio of the front and rear wheels on the left-hand side and that of the front and rear wheels on the right-hand side and the regression coefficient correction means which corrects the linear regression coefficient in accordance with an average fluctuation amount of the amount of fluctuation per each specified distance of the running distance.

Figure 3:
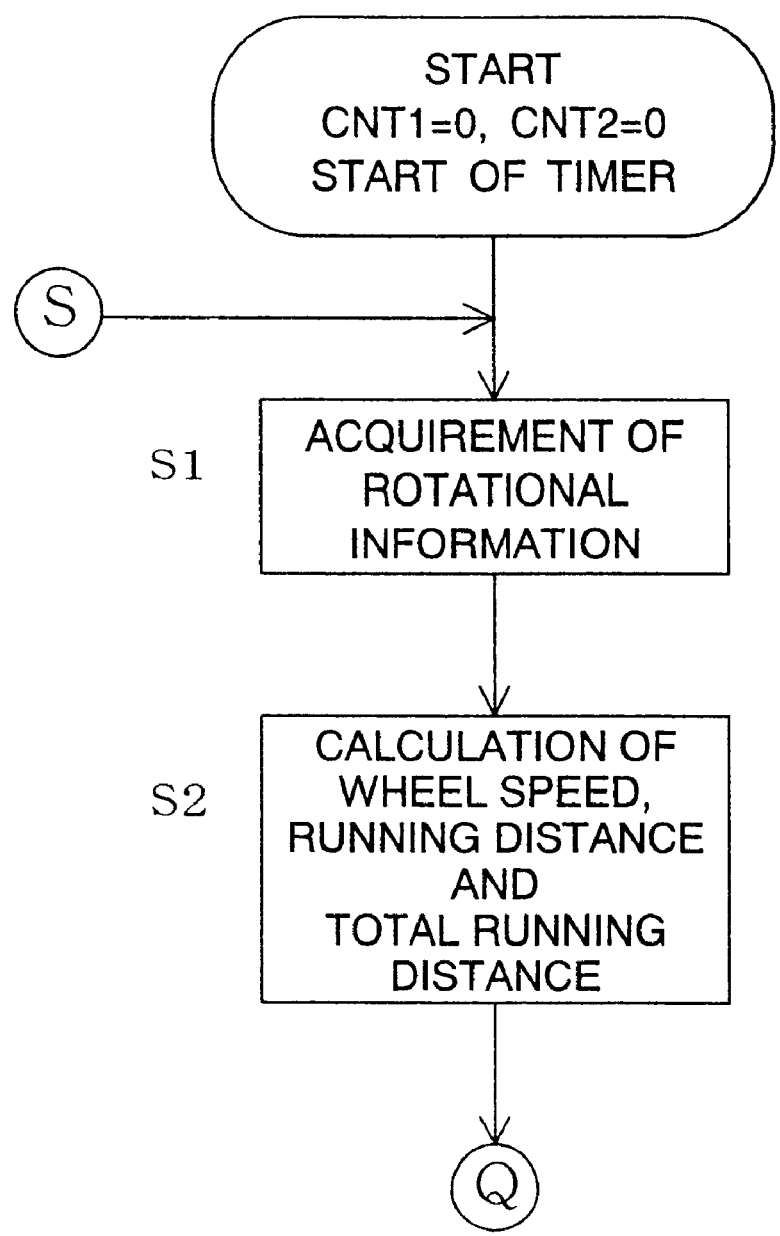
FIG. 3 is one example of a flow chart related to the method for alarming decrease in tire air-pressure according to the present invention.
Figure 4:
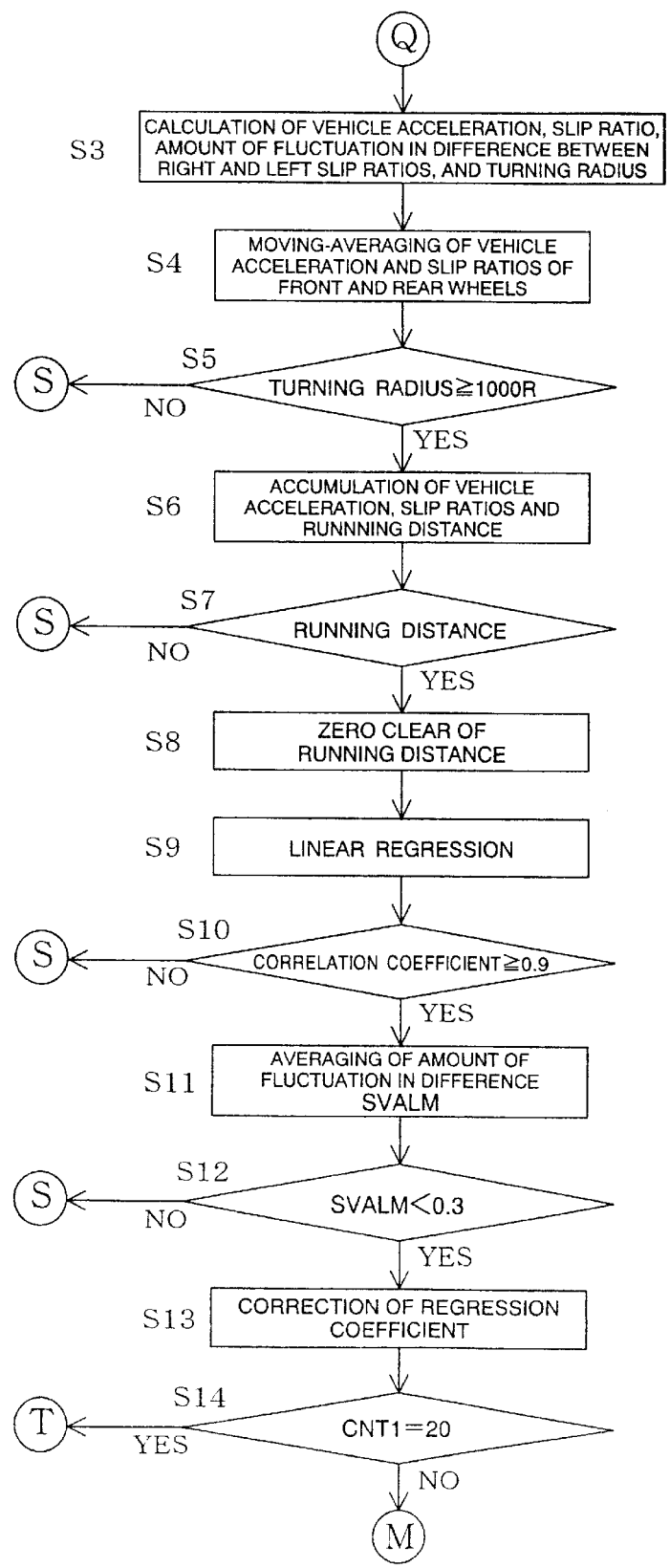
FIG. 4 is one example of a flow chart related to the method for alarming decrease in tire air-pressure according to the present invention.

Processes for obtaining a relationship between the vehicle acceleration and the slip ratio will now be explained on the basis of an example in which four wheels are simultaneously decompressed. As illustrated in FIGS. 3 to 4, the rotational information is first acquired whereupon the wheel speeds, the running distance and the total running distance are calculated (Steps S1, S2), and the vehicle acceleration, the slip ratio between the front and rear wheels, the running distance and the turning radius are calculated from the wheel speeds of the four wheels (Step S3). It should be noted that the amount of fluctuation in the difference between the right and left slip ratios in Step S3 will be described later.

Moving-averaging of the vehicle acceleration and the slip ratios of the front and rear wheels is then performed (Step S4). The running distance, the moving-averaged vehicle acceleration and slip ratio are accumulated when the turning radius is not less than a specified value, for instance, 1,000 R (Steps S5, S6). It should be noted that the turning radius is defined for the purpose of eliminating influences of lateral directional acceleration while performing turning movements.

The linear regression coefficients K2 of the vehicle acceleration and the slip ratios (regression coefficient of the vehicle acceleration to the slip ratios of the front and rear wheels) and a correlation coefficient R are obtained (Steps S9, S10) when the running distance reaches a specified value, for instance, 1,000 m (Step S7). Here, the linear regression coefficient K2 when the correlation coefficient R is not less than a specified value, for instance, 0.9, (hereinafter referred to as merely "regression coefficient") equals the relationship between the vehicle acceleration and the slip ratios, and this regression coefficient K2 is defined to be a judged value for internal pressure. At this point, the running distance is cleared to be zero (Step S8). This is for detecting decrease in internal pressure of a tire on the basis of data corresponding to 1,000 m each. When detection is to be performed on the basis of data corresponding to not less than 5,000 m, the correlation coefficient of the linear regression coefficient will not easily become not less than the specified value since data are accumulated for as much as 5,000 m so that variation in data occurs due to various factor such as road surface $\mu$, gradients of road surfaces or running speeds. On the other hand, when the distance is too short, while the correlation coefficient will be high, possibilities that variations in linear regression coefficients are found will be high owing to influences of road surface $\mu$. The running distance is thus cleared to zero when a specified value is exceeded. It should be noted that such a specified value might be defined to be 500 to 2,000 m besides the above-mentioned value of 1,000 m.

However, the regression coefficient K2 is not only varied due to decrease in internal pressure but also due to factors such as friction coefficients of the road surface ($\mu$) and time-varying changes in the tires.

(1) The regression coefficients might vary also in a single tire depending on whether the friction coefficient of the road surface is low or high. For instance, a small slip rate is sufficed for obtaining the same acceleration (driving force) in case of high $\mu$ rather than low $\mu$ when considering a relationship between the acceleration and the slip rate ($\mu$-s gradient). Since a grounding area of a tire of low internal pressure is larger than that of high internal pressure, the tires shift in a direction of gripping in a firmer manner. Thus, the regression coefficient changes in the same direction as when the internal pressure has decreased when the friction coefficient of the road surface is high in comparison with a road surface of low friction coefficient.

(2) The regression coefficient also varies depending on whether the tire is new or worn. When a tread is worn, its tread rigidity will become larger and the tire shifts in a direction of gripping in a firmer manner, and the regression coefficient changes in the same direction as when the internal pressure has decreased.

Accordingly, it is necessary to distinguish, when determining decrease in internal pressure on the basis of the regression coefficient, to which of the factors of decrease in internal pressure, changes in friction coefficient of the road surface or time-varying changes of the tire, the decrease is due.

A case for coping with a change in friction coefficient of the road surface will first be considered. Obtaining the regression coefficient shall be limited to a road of high $\mu$ such as an asphalt road of which the friction coefficient of the road surface is stable. This is since the relationship between the vehicle acceleration and the slip ratio will be varied and the correlation coefficient will hardly exceed the specified value when data of 1,000 m are accumulated when running on a snowy road or a frozen road of which the friction coefficient is unstable. Since the regression coefficient is obtained only on a road surface of high $\mu$, erroneous judgment owing to changes in frictional coefficients of road surfaces will hardly occur. When running on a road surface of low $\mu$, the judged value (regression coefficient) will shift in a direction opposite to that indicating decrease in internal pressure, no erroneous judgment will be made. However, it might happened that a regression coefficient which includes small variations in data and differs from that of a road surface of high $\mu$ is obtained when running on an evenly pressurized snowy road. Should the vehicle perform running on such a road surface for a long period of time immediately after operating the initialization switch, the initial setting will be wrong and erroneous alarm might be issued upon determining that the internal pressure has decreased when the vehicle performs running on a road surface of high $\mu$ such as an asphalt road thereafter. It is accordingly necessary to correct the obtained regression coefficient considering a case in which the correlation coefficient has increased upon running on a road surface of low $\mu$.

Processes for correcting the regression coefficient will now be explained. After obtaining a difference between right and left slip ratios (respective slip ratios of front and rear wheels on the left-hand side and front and rear wheels on the right-hand side) on the basis of wheel speeds of the four wheels, the amount of fluctuation, that is, variations in the differences is obtained (Step S3). After accumulating the amounts of fluctuation until the specified running distance (1,000 m) has been reached (Steps S5, S6), the regression coefficient is corrected by an average value of the amount of fluctuation (SVALM)(Steps S11 to S13). When the average fluctuation amount SVALM is not less than a specified value, for instance, 0.3, the obtained linear regression coefficient K2 is rejected since the road surface condition is unstable even if the correlation coefficient R should be larger than the specified value (0.9). In performing correction of the regression coefficient, it is aimed to distinguish a road surface of low $\mu$ on the basis of an average fluctuation amount of the right and left slip ratios, which is another way for determination, which could not have been made on the basis of the relationship between the vehicle acceleration and the slip ratio alone, when the correlation coefficient has exceeded the specified value (0.9) when running on a road surface of low $\mu$ as discussed above. More particularly, the larger the average fluctuation amount of the difference in right and left slip ratios is, it is recognized that the vehicle is running on a road surface of low $\mu$, and the regression coefficient is corrected when the value of the average fluctuation value is not more than the specified value.

Figure 5:
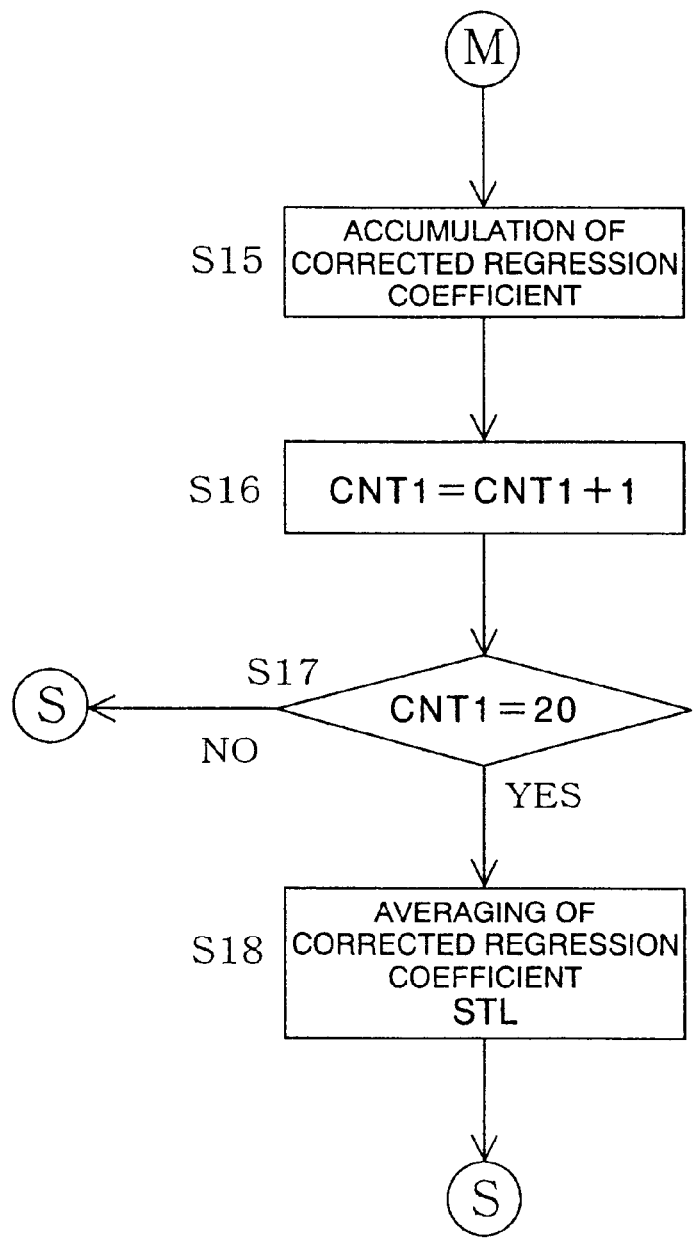
FIG. 5 is one example of a flow chart related to the method for alarming decrease in tire air-pressure according to the present invention.

As illustrated in FIGS. 4 and 5, a specified number, for instance, 20 of regression coefficients of the slip ratio with respect to the vehicle acceleration which has been corrected in accordance with the average fluctuation amount of the difference in the right and left slip ratios are preliminarily averaged immediately after the initialization switch has been operated, and the average value is stored as a regression coefficient of a tire of reference internal pressure (reference value for internal pressure) STL (Steps S14 to S18).

Figure 6:
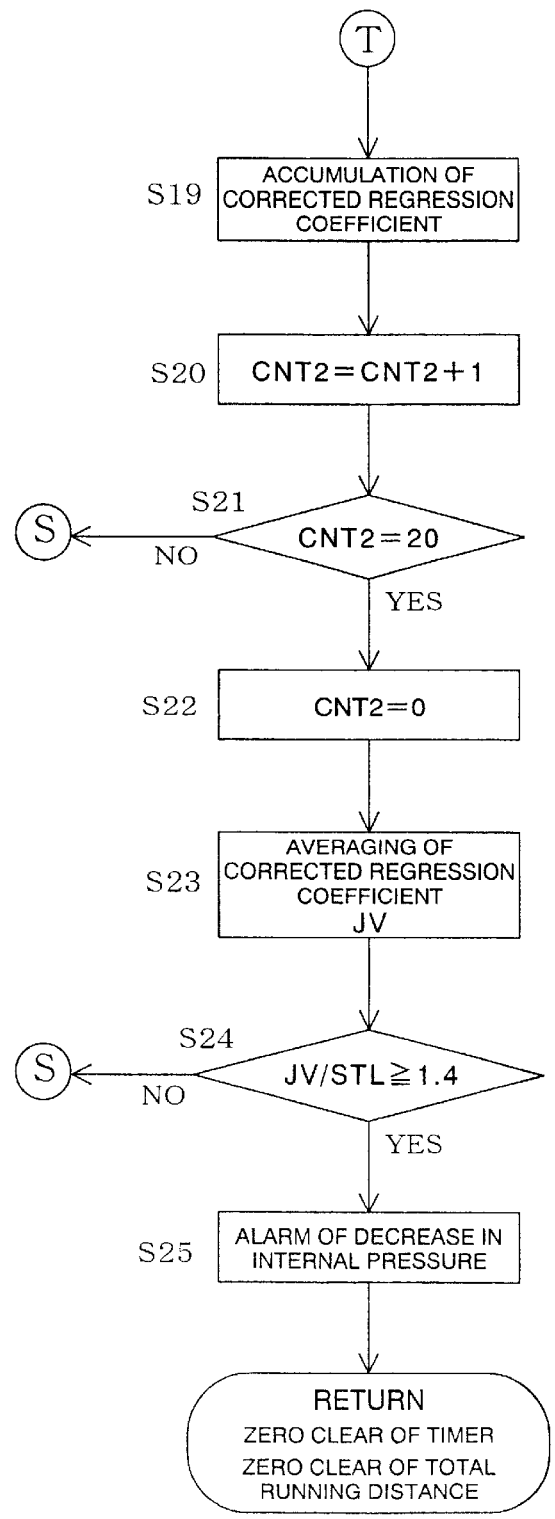
FIG. 6 is one example of a flow chart related to the method for alarming decrease in tire air-pressure according to the present invention.

Thereafter, as illustrated in FIGS. 4 and 6, the regression coefficient during running of the vehicle is calculated through Steps S1 to S14 for obtaining a judged value for the regression coefficients JV as an average value of a specified number, for instance, 20 (Steps S14, S19 to S23), which is compared with the reference value for internal pressure STL (Step S24). When the ratio of the judged value JV to the reference value for internal pressure STL (JV/STL) is not less than a threshold of, for instance, 1.4, the driver is alarmed of decrease in internal pressure (Step S25). It should be noted that the threshold is set upon preliminarily performing experiments for each vehicle.

In the present embodiment, a case for coping with time-varying changes in tires is also considered. Time-varying changes in tires particularly indicate hardening of rubber which are due to time-varying changes or wear of treads. The regression coefficient changes upon hardening of rubber or wear of treads. The direction of change is identical to the direction when the internal pressure has decreased. It should be noted that hardening of rubber or wear of treads owing to time-varying changes will not progress abruptly.

Simultaneous decompression of four wheel tires is a phenomenon which occurs due to natural leak and does not occur abruptly. Accordingly, it is possible to perform detection since the amount of change in the regression coefficient, which changes owing to time-varying changes over approximately several months or a year, is smaller than the amount of change by which the regression coefficient changes upon decrease of the internal pressure of the four wheel tires by, for instance, 30%. When a tire has been exchanged or an internal pressure of a tire is set to be a reference internal pressure, and the initialization switch is not repeatedly operated after the initialization switch has been pressed by the driver until a specified period of time, for instance, a year, has elapsed or the total running distance has reached a specified distance, for instance, 20,000 km, another alarm for urging check of the air-pressure of the tires is issued. In contrast thereto, when the amount of change in the regression coefficient has exceeded the specified threshold before the specified period of time has elapsed or the specified distance been traveled after the initialization switch has been operated (adjustments to reference internal value have been performed), it is determined that a tire has decompressed and an alarm for indicating decrease in internal pressure is issued. In this manner, the internal pressure is once checked to perform repeated initialization operations also for the purpose of eliminating erroneous alarm owing to time-varying changes in the tires as discussed above when the vehicle has been running for the specified period of time or for the specified distance even if the amount of change in the regression coefficient has not exceeded the specified threshold. It should be noted that it is known from experiments that the amount of change in the regression coefficient when the tread is worn by 3 mm when compared to that of a new tire is substantially of the same level as the amount of change when the internal pressure has decreased by 30% of normal internal pressure. Since a tire is hardly worn by as much as 3 mm under normal conditions of use after using the tire for a year or when the traveled distance is 20,000 km, it is possible to determine decrease in internal pressure by approximately 30%.

Figure 7:
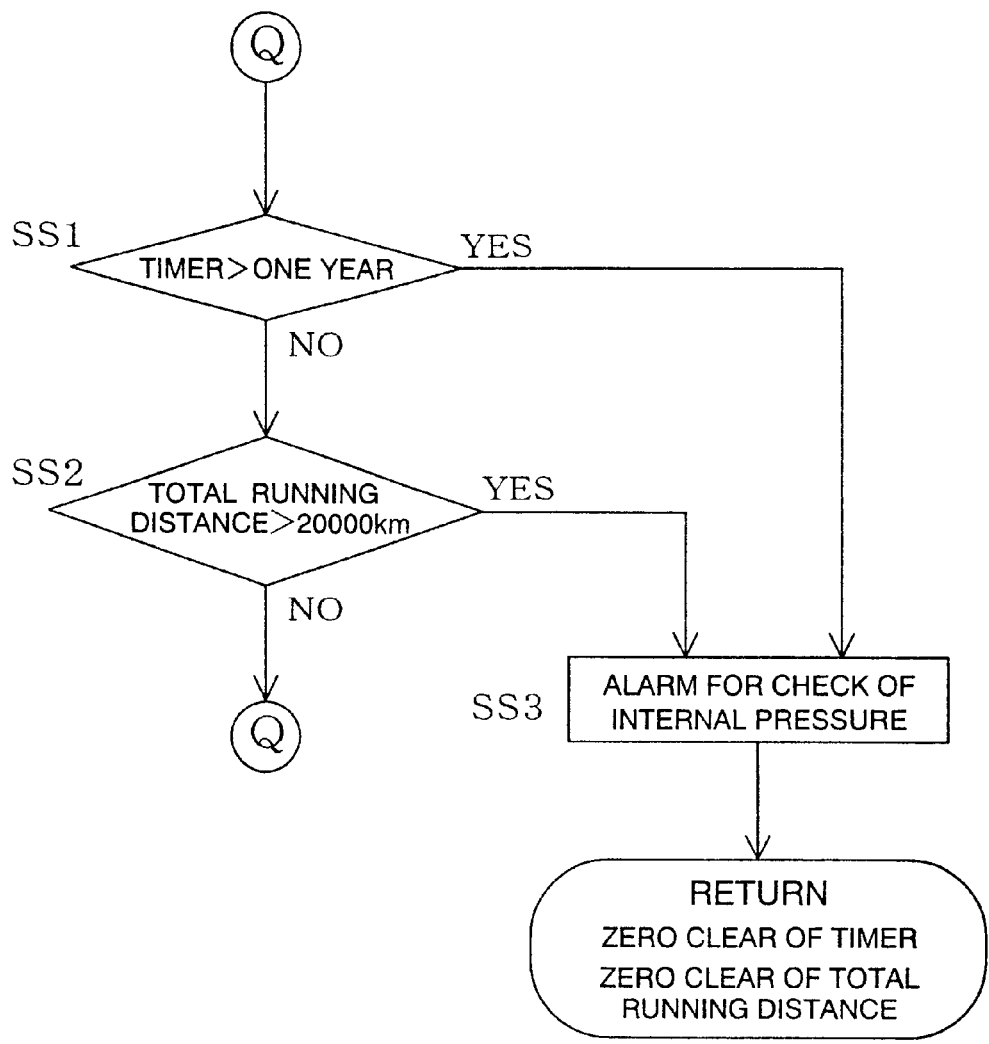
FIG. 7 is one example of a flow chart related to the method for alarming decrease in tire air-pressure according to the present invention.

Accordingly, safe driving is secured to a driver upon considering time-varying changes in the tires in the course of processes as illustrated in FIGS. 3 and 4. More particularly, according to the present embodiment, the time elapsed since the initialization switch has been operated is stored in a timer as illustrated in FIG. 7 and when the initialization switch has not been operated for a specified period of time, for instance, a year (Step SS1), or the total distance which has been traveled after the initialization switch has been operated has reached a specified distance, for instance, 20,000 km (Step SS2), the driver is alarmed to inspect the internal pressure of the tires (Step SS3).

Processes (1) to (13) of actions of the apparatus for alarming decrease in tire air-pressure according to the present embodiment will now be explained hereinafter.

(1) The wheel speeds ($V1_n$, $V2_n$, $V3_n$, $V4_n$) are calculated from the respective rotational velocities of the four wheel tires of the vehicle FL, FR, RL and RR.

Wheel speed data obtained at an arbitrary point of time of the respective wheel tires FL, FR, RL and RR from a sensor such as an ABS sensor are defined to be wheel speeds $V1_n$, $V2_n$, $V3_n$, $V4_n$.

(2) Average wheel speeds of following wheels and driving wheels ($Vf_n$, $Vd_n$) are calculated.

If the vehicle is a front wheel drive vehicle, average wheel speeds of the following wheels and the driving wheels $Vf_n$, $Vd_n$ are obtained from the following equations (1), (2).

$$Vf_n = (V3_n + V4_n)/2 \quad (1)$$

$$Vd_n = (V1_n + V2_n)/2 \quad (2)$$

(3) The traveling distance of the vehicle per unit time is then calculated from equation (3) below.

$$DIST = Vf_n \times \Delta t \quad (3)$$

Here, $\Delta t$ is a time interval (sampling time) between average wheel speed $Vf_n$ and $Vf_{n-1}$ of the following wheels calculated on the basis of the wheel speed data.

(4) The difference SSR between slip ratios of the left-sided front and rear wheels and right-sided front and rear wheels is then calculated from the following equation (4).

$$SSR = |V_1/V_3 - V_2/V_4| \quad (4)$$

(5) Thereafter, an amount of fluctuation SVAL in the difference SSR of the slip ratios is calculated from equation (5) below, and an average fluctuation amount SVALM for this amount of fluctuation SVAL is calculated for every specified traveling distance, for instance, every 1,000 m.

$$SVAL_n = |SSR_n - SSR_{n-1}| \quad (5)$$

(6) The acceleration of the vehicle (that is, an average acceleration/deceleration speed of the following wheels) $Af_n$ is calculated.

Supposing that an average wheel speed obtained from wheel speed data preceding the average wheel speed $Vf_n$ of the following wheels by one is $V1_{n-1}$, the acceleration/deceleration of the vehicle $Af_n$ is given by the following equation (6).

$$Af_n = (Vf_n - Vf_{n-1}) \Delta t/g \quad (6)$$

Here, $\Delta t$ is a time interval (sampling time) between average wheel speed $Vf_n$ and $Vf_{n-1}$ of the following wheels calculated on the basis of the wheel speed data, and g is acceleration of gravity.

(7) The slip ratio of the front and rear wheels is calculated in accordance with the value of the acceleration $Af_n$ of the vehicle.

The slip ratio $S_n$ is calculated from the following equations (7) and (8) provided that no conditions come true in which the vehicle is making a slip with the driving wheels being in a locked condition under acceleration ($Vd_n=0$, $Vf_n \neq 0$) or in which the driving wheels are wheel-spinning with the vehicle being in a halted condition under deceleration ($Vf_n=0$, $Vd_n \neq 0$)

If $Af_n \geq 0$ and $Vd_n \neq 0$, $$S_n = (Vf_n - Vd_n)/Vd_n \quad (7)$$

If $Af_n < 0$ and $Vf_n \neq 0$, $$S_n = (Vf_n - Vd_n)/Vf_n \quad (8)$$

If none of the above are satisfied, $S_n = 1$ will come true.

(8) The turning radius of the vehicle is calculated on the basis of the wheel speed of the following wheels and a tread width Tr of the following wheels from the following equation (9).

$$R = \frac{V3n - V4n}{V3n + V4n} \times 2 \times \frac{1}{Tr} \quad (9)$$

(9) Data of the slip ratio of the front and rear wheels and acceleration of the vehicle are then processed to undergo moving-averaging for every sampling time.

As for the slip ratio, $$MS_n = (S_1 + S_2 + \ldots + S_n)/N \quad (10)$$

$$MS_{n+1} = (S_2 + S_3 + \ldots + S_{n+1})/N \quad (11)$$

$$MS_{n+2} = (S_3 + S_4 + \ldots + S_{n+2})/N \quad (12)$$

As for the acceleration/deceleration of the vehicle, $$MAf_n = (Af_1 + Af_2 + \ldots + Af_n)/N \quad (13)$$

$$MAf_{n+1} = (Af_2 + Af_3 + \ldots + Af_{n+1})/N \quad (14)$$

$$MAf_{n+2} = (Af_3 + Af_4 + \ldots + Af_{n+2})/N \quad (15)$$

The moving-averaged slip ratios and acceleration/deceleration of the vehicle are accumulated until the traveling distance has reached a specified distance for obtaining regression coefficients and a correlation coefficient.

(10) When the traveled distance is a specified distance, the regression coefficients, namely a regression coefficient K1, which is a ratio of the slip ratio of the front and rear wheels to the vehicle acceleration and a regression coefficient K2, which is a ratio of the vehicle acceleration to the slip ratio of the front and rear wheels, and a correlation coefficient R are calculated.

$$K1 = \frac{\sum (MAf_i \times MS_i) - N \times \overline{MAf} \times \overline{MS}}{\sum MAf_i^2 - N \times \overline{MAf} \times \overline{MAf}} \quad (16)$$

$$K2 = \frac{\sum (MAf_i \times MS_i) - N \times \overline{MAf} \times \overline{MS}}{\sum MS_i^2 - N \times \overline{MS} \times \overline{MS}} \quad (17)$$

Here, $\overline{MS}$ and $\overline{MAf}$ denote average values of N-number of slip ratios and acceleration/deceleration of the vehicle, respectively, which underwent moving-averaging.

The correlation coefficient R is obtained as $$RA = K1 \times K2 \quad (18)$$

(11) The value for the regression coefficient K2 is corrected in accordance with the average amount of fluctuation SVALM and a threshold is set by using the regression coefficient K2. The regression coefficient K2 to be corrected is calculated from the slip ratio with respect to the vehicle acceleration per each specified distance, wherein the correlation coefficient R exceeds the specified value, for instance, 0.9. Here, when the average amount of fluctuation SVALM is not less than the specified value of 0.3, the obtained regression coefficient K2 is rejected since the road surface condition is considered to be unstable, even if the correlation coefficient R is larger than the specified value.

In one example for correcting the regression coefficient K2, correction is first performed on the basis that the larger the average amount of fluctuation SVALM is, the lower the $\mu$ of the road surface will be. A value obtained by multiplying the average amount of fluctuation SVALM by a, for instance, 0.1, is subtracted from the value for the regression coefficient K2. It should be noted that the value for a is set upon preliminarily performing experiments for each vehicle.

$$\text{Corrected regression coefficient} = K2 - \alpha \times SVALM \tag{18}$$

(12) The above steps are repeated starting from count zero until repetitions are performed for, for instance, 20 times. When the count reaches 20, averaging of the corrected regression coefficients is performed for storing a regression coefficient when the tire is at the reference internal pressure (reference value for internal pressure) STL. Then, the regression coefficient during running is calculated for obtaining a judged value for the regression coefficients JV as an average of a specified number, for instance, 20, which is then compared with the reference value for internal pressure STL.

(13) When the ratio of the judged value JV to the reference value for internal pressure STL (JV/STL) is not less than a threshold, for instance, 1.4, the driver is alarmed of a decrease in internal pressure. It should be noted that the threshold is set upon preliminarily performing experiments for each vehicle.

EXAMPLE

While the present invention will now be explained on the basis of an example thereof, the present invention is not to be limited to such an example alone.

A front wheel drive vehicle was prepared, and an apparatus for alarming decrease in tire air-pressure, which has been programmed to judge whether all of the four wheel tires have simultaneously decompressed or not by comparing a judged value for the regression coefficient and a reference value for internal pressure for the regression coefficient which has been preliminarily calculated when the tires were of reference internal pressure with regression coefficients of the vehicle acceleration and the slip ratio of the front and rear wheels being used as judged values, was mounted to this vehicle.

In this example, conditions for decompression were employed in which the internal pressure of the four wheel tires were of normal internal pressure, decompressed by 30% and decompressed by 50% in order to test on judgment for simultaneous decompression of four wheel tires. The regression coefficient of the slip ratio to the vehicle acceleration was measured, and correction was performed through an average fluctuation amount in a difference between right and left slip ratios.

It was consequently found that the reference value for internal pressure (STL) measured at the time of normal air-pressure was 27.0. The judged values of internal pressure (JV) when decompressed by 30% and decompressed by 50% were 41.7 and 62.5, respectively. Owing to the fact that the ratio of the judged value internal pressure (JV) to the reference value for internal pressure (STL) was accordingly 1.54 when decompressed by 30% and 2.31 when decompressed by 50%, it can be understood that an alarm can be reliably issued to cope with decompression by not less than 30% by setting the threshold to 1.4.

As explained so far, according to the present invention, it is possible to improve performance and safety of the vehicle since it is possible to detect decompression of tires including at least one driving wheel tire, for instance, of not less than two wheel tires including the right and left driving wheels.

What is claimed is:

1. A method for alarming decrease in tire air-pressure, which alarms decrease in internal pressure of a tire on the basis of rotational information obtained from tires attached to a vehicle, the method comprising the steps of: detecting rotational information of respective tires; respectively calculating and storing a wheel speed, a vehicle acceleration, a slip ratio between front and rear wheels, a running distance and a turning radius on the basis of the rotational information of the respective tires; performing moving averaging of the vehicle acceleration and the slip ratio between front and rear wheels; accumulating the running distance, the moving-averaged vehicle acceleration and the slip ratio between front and rear wheels when the turning radius is not less than a specified value; obtaining a linear regression coefficient and a correlation coefficient of the vehicle acceleration and the slip ratio between front and rear wheels when the accumulated running distance has reached a specified distance; judging whether at least a driving wheel tire has decompressed upon comparing a judged value of the linear regression coefficient and a reference value for internal pressure of the linear regression coefficient which has been preliminarily calculated in the above step when the tires are reference internal pressure, the linear regression coefficient when the correlation coefficient is not less than a specified value being set as the judged value; and issuing an alarm of decrease in tire air-pressure on the basis of the result of judgment of decompression.

2. The method of claim 1, wherein the method further includes the steps of calculating amount of fluctuation in a difference between respective slip ratio of the front and rear wheels on the left-hand side and that of the front and rear wheels on the right-hand side, and correcting the linear regression coefficient in accordance with an average fluctuation amount of the amount of fluctuation per each specified distance of the running distance.

3. The method of any one of claims 1 or 2, wherein the method further includes the step of issuing an alarm to inspect an air-pressure of a tire when the initialization switch has not been operated or when a total running distance until the initialization switch is repeatedly operated after the initialization switch has been operated once.

4. An apparatus for alarming decrease in tire-air-pressure, which alarms decrease in internal pressure of a tire on the basis of rotational information obtained from tires attached to a vehicle, the apparatus comprising: rotational information detecting means which detects rotational information of respective tires; a first calculating means which respectively calculates and stores a wheel speed, a vehicle acceleration, a slip ratio between front and rear wheels, a running distance and a turning radius on the basis of the rotational information of the respective tires; a second calculating means which performs moving averaging of the vehicle acceleration and the slip ratio between front and rear wheels; an accumulating means which accumulates the running distance, the moving-averaged vehicle acceleration and the slip ratio between front and rear wheels when the turning radius is not less than a specified value; a third calculating means which obtains a linear regression coefficient and a correlation coefficient of the vehicle acceleration and the slip ratio between front and rear wheels when the accumulated running distance has reached a specified distance; a decompression judging means which judges whether at least a driving wheel tire has decompressed upon comparing a judged value of the linear regression coefficient and a reference value for internal pressure of the linear regression coefficient which has been preliminarily calculated when the tires are reference internal pressure, the linear regression coefficient when the correlation coefficient is not less than a specified value being set as the judged value; and an alarming means which issues an alarm of decrease in tire air-pressure on the basis of the result of judgment of decompression.

5. The apparatus of claim 4, wherein the apparatus further includes a fourth calculating means which calculates an amount of fluctuation in a difference between respective slip ratio of the front and rear wheels on the left-hand side and that of the front and rear wheels on the right-hand side, and a regression coefficient correction means which corrects the linear regression coefficient in accordance with an average fluctuation amount of the amount of fluctuation per each specified distance of the running distance.

6. The apparatus of any one of claims 4 or 5, wherein the apparatus further includes a second alarming means which issues an alarm to inspect an air-pressure of a tire when the initialization switch has not been operated or when a total running distance until the initialization switch is repeatedly operated after the initialization switch has been operated once.

7. A computer program on a computer readable medium for judging decompression of a tire, wherein a computer is made to function, for judging decrease in tire air-pressure, as a first calculating means which respectively calculates and stores a wheel speed, a vehicle acceleration, a slip ratio between front and rear wheels, a running distance and a turning radius on the basis of the rotational information of the respective tires; a second calculating means which performs moving averaging of the vehicle acceleration and the slip ratio between front and rear wheels; an accumulating means which accumulates the running distance, the moving-averaged vehicle acceleration and the slip ratio between front and rear wheels when the turning radius is not less than a specified value; a third calculating means which obtains a linear regression coefficient and a correlation coefficient of the vehicle acceleration and the slip ratio between front and rear wheels when the accumulated running distance has reached a specified distance; and a decompression judging means which judges whether at least a driving wheel tire has decompressed upon comparing a judged value of the linear regression coefficient and a reference value for internal pressure of the linear regression coefficient which has been preliminarily calculated when the tires are of reference internal pressure, the linear regression coefficient when the correlation coefficient is not less than a specified value being set as the judged value.

8. The computer program on a computer readable medium of claim 7, wherein the computer is further made to function as the fourth calculating means which calculates an amount of fluctuation in a difference between respective slip ratio of the front and rear wheels on the left-hand side and that of the front and rear wheels on the right-hand side, and the regression coefficient correction means which corrects the linear regression coefficient in accordance with an average fluctuation amount of the amount of fluctuation per each specified distance of the running distance.

* * * * *